United States Patent [19]

Katzer

[11] 4,053,034
[45] Oct. 11, 1977

[54] MOUNT FOR A RAILWAY VEHICLE DISC BRAKE

[75] Inventor: Ernst Katzer, Munich, Germany

[73] Assignee: Knorr-Bremse GmbH, Munich, Germany

[21] Appl. No.: 655,566

[22] Filed: Feb. 5, 1976

[30] Foreign Application Priority Data

Feb. 5, 1975 Germany .................. 2504804

[51] Int. Cl.² .............. F16D 65/14; F16C 27/06
[52] U.S. Cl. .................. 188/206 R; 308/28; 308/120 R; 308/238
[58] Field of Search ........... 267/54 A; 308/238, 120, 308/28, 29, 120 R; 188/59, 206 R

[56] References Cited

U.S. PATENT DOCUMENTS

| 1,729,328 | 9/1929 | Chilton | 267/54 A |
|---|---|---|---|
| 2,308,967 | 1/1943 | Kuss | 267/54 A |
| 2,479,085 | 8/1949 | Schrage | 188/59 |
| 3,411,803 | 11/1968 | Melton et al. | 308/238 |
| 3,966,276 | 6/1976 | Bellarbre et al. | 308/238 |

Primary Examiner—Richard A. Bertsch
Attorney, Agent, or Firm—Edmund M. Jaskiewicz

[57] ABSTRACT

A disc brake for a railway vehicle has a resilient mount for a cross-member upon the ends of which are pivotally mounted brake levers having brake shoes which are engageable with a brake disc mounted on either the wheel or the axle of the railway vehicle. Attached to the cross-piece is a bushing which is supported between two trunion bearings by a bolt passing therethrough. A pair of compressible rubber sleeves are inserted into the bushing to surround the bolt and the outer ends of the sleeves are provided with flanges. A pair of clamping sleeves each having a cylindrical portion are positioned in the trunion bearings and their inner ends are provided with flanges which engage the rubber sleeve flanges. The cylindrical portions have a plurality of axial slots extending from the outer ends thereof and the outer ends of the cylindrical portion have beveled surfaces engaged by corresponding beveled surfaces on washers or other fastener elements such that tightening of the bolt through the bushing will expand the slotted cylindrical portions against the trunion bearings.

3 Claims, 2 Drawing Figures

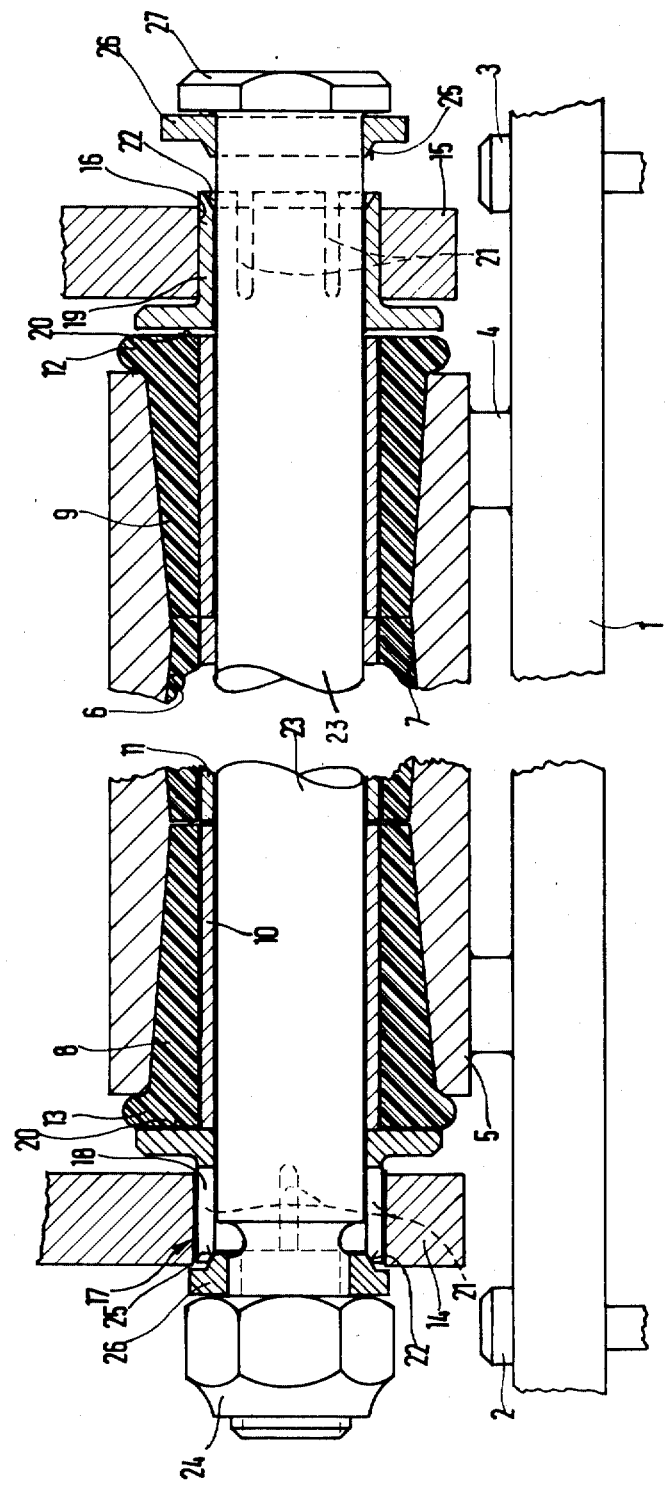

MOUNT FOR A RAILWAY VEHICLE DISC BRAKE

The present invention relates to disc brakes for a railway vehicle, more particularly, to the resilient mounting from the vehicle frame of a cross-member upon the ends of which are pivotally mounted brake levers having brake shoes thereon engageable with the brake disc.

A disc braking system for railway vehicles and other vehicles generally comprises at least one rotary brake element in the form of a brake disc mounted on either the wheel or the axle of the vehicle. The brake shoes which are pressed against the brake disc to achieve the braking action are pivotally mounted on the ends of two forked levers. The forked levers are in turn pivotally mounted on pins or bolts attached in a cross-piece which is resiliently and pivotally mounted to the frame of the vehicle by means of a bushing and bolt passing therethrough which is either parallel with or perpendicular to the plane of the brake disc. The bolt and bushing are connected to each other by means of a pair of compressible rubber sleeves each pushed from one side into the bushing. The outer end of the rubber sleeves are provided with beads or flanges each of which are subjected to the pressure brought about by threading a nut on the end of the bolt passing through the bushing.

It has been known to provide in such a disc braking system having a bushing for resilient pivot mounting of the cross-piece a pair of compressible rubber sleeves in the bushing which are cylindrical and slightly tapered. These rubber sleeves are pushed into the bushing from both sides thereof so as to have a permanent space between their inner ends. The outer ends of the rubber sleeves are each provided with a bead and these beaded ends are pressed and jammed inwardly by tightening the bolt passing through the bushing such that the inner ends of the rubber sleeves contact each other and the space therebetween does not exist.

With this above described prior art arrangement there is provided in each trunion bearing a bushing or sleeve having a flange at its inner end which flange is pressed against the beaded end of the respective rubber sleeve. In the assembled state of this mount after the rubber sleeves on the bolt have been pressed toward each other, slight spaces will remain between the bolt head and the nut thereon with respect to the outer faces of the trunion bearings. In this mount arrangement, the sleeves are axially displaceable within the trunion bearings in combination with the rubber sleeves since the flanges of the sleeves in the trunion bearings have a clearance with respect to the inner faces of the trunion bearings. The axial displacement of the sleeves may occur only with considerable frictional resistance. However, under the pressure exerted by threading the nut on the end of the bolt passing through the bushing, the mount will have a slight clearance within the trunion bearings which clearance is directed in the longitudinal direction of the bolt.

This known mount for the cross-piece which the brake fork levers were mounted had the disadvantage that the mount was subjected to stresses brought about by shocks and impacts occuring during travel of the vehicle and during the braking operation. These shocks and impacts produced numerous acceleration forces acting in various directions. The existence of only a slight clearance or play between the ends of the sleeves passing through the trunion bearings and the lateral surfaces of the trunion bearing mounts gave rise to a risk of damage or "flattening" of the bearing elements which could result in their destruction.

It is therefore the principal object of the present invention to provide such a mount which is resilient but which does not include any play or clearance between the components thereof in their assembled state.

It is another object of the present invention to provide such a mount having a simple and relatively inexpensive structure wherein the sleeves passing through the trunion bearing are rigidly and non-displaceably held in position within the bearings when the mount is tightened into its assembled state.

According to one aspect of the present invention the resilient pivot mount as described above is provided with a pair of clamping sleeves each having a cylindrical portion in each trunion bearing and a flange at one end of the cylindrical portion engageable with the outer flanged end of a respective rubber sleeve. Each cylindrical portion is provided with a plurality of axial slots extending substantially the length of the cylindrical portion from the end of the cylindrical portion away from its flange. This slotted end of the cylindrical portion has an inwardly beveled surface which is engageable with correspondingly shaped surface on a fastener means on the bolt. Thus, tightening of the fastener elements on the bolt will spread apart the slotted cylindrical portions of the clamping sleeves and cause the cylindrical portions to be forced against the trunion bearings.

When the bolt in the mount of this invention is thus tightened there will be no clearance or play between the bolt head or bolt nut with respect to the lateral surfaces of the bearing trunions and, there will thus be no liklihood of flattening or otherwise damaging the bearings.

Other objects and advantages of the present invention will be apparent upon reference to the accompanying description when taken in conjunction with the following drawings, which are exemplary, wherein;

FIG. 1 is a longitudinal sectional view of one side of a mount according to the present invention with the components being shown in the assembled state wherein the nut on the through bolt has been tightened; and, FIG. 2 is a view similar to that of FIG. 1 but of the other side of the mount but showing the elements in the untightened state.

Proceeding next to the drawings wherein like reference symbols indicate the same parts throughout the various views a specific embodiment of the present invention will be described in detail.

The disc brake mount as shown in FIGS. 1 and 2 comprises a cross-piece 1 at the ends of which are bolts 2 and 3 for respectively mounting two brake fork levers (not shown) on the ends of which the brake shoes are mounted for engagement with the brake disc. The other end of the brake fork levers are connected to a brake rigging or other operating structure by means of which the brakes are actuated.

On the upper surface of the cross-piece 1 there is attached an intermediate connecting member 4 which is in turn attached to a bushing 5. The interior of the bushing tapers inwardly from the outer ends thereof so as to form two inwardly tapering or conical surfaces 6 and 7. Two identical compressible rubber sleeves 8 and 9 each of which has outer conical surface conforming to the taper of the internal surfaces 6 and 7 is inserted into each end of the bushing and metal sleeves 10 and 11 are inserted into each of the rubber sleeves. The outer ends of rubber sleeves 8 and 9 project outwardly of the bushing 5 and are formed with an annular bead or external flanges 12 and 13.

A support bracket has at its lower ends a pair of spaced arms in which are formed trunion bearings 14 and 15 having bearing openings 16 therethrough. The upper end of the bracket, while not shown, is attached to the railway vehicle frame or a component of the frame in a known manner. Into each of the trunion bearings 14 and 15 a clamping sleeve 18, 19 is inserted in such a manner that an external flange 20 formed on each of the clamping sleeves is engageable with the beads 12 and 13 on the compressible rubber sleeves. Each clamping sleeve 18 and 19 has a cylindrical portion 17 whose length is slightly longer than the thickness of the trunion bearings 14 and 15 so that when the rear face of a clamping sleeve flange 20 contacts the inner lateral surface of a trunion bearing 14, 15 the end of the cylindrical portion will project slightly from the face of the trunion bearing remote from the flange 20. The cylindrical portion 17 has a plurality of axially extending slots 21 formed therein which slots extend from the outer or projecting end of the cylindrical portion as may be seen in the drawings. An inwardly directed beveled surface 22 is formed at the projecting end of the cylindrical portion.

A threaded bolt 23 passes through the bearing trunions 14, 15, the clamping sleeves 18, 19, and the metal sleeves 10, 11 in the rubber sleeves 8, 9 to interconnect these components. The bolt is formed with a head 27 and a nut 24 is threaded onto the other end of the bolt. Washers or intermediate discs 26 are positioned on each end of the bolt 23 immediately inward of the head 27 and nut 24 and each washer is provided with a beveled surface 25 conforming to the beveled edges 22 on the clamping sleeves 18 and 19.

In the modification of the present invention the counter beveled surfaces 25 may be formed directly on the inwardly directed surfaces of the bolt head 27 and the bolt nut 24.

The final assembly of the resilient mount as described above will provide a maximum resilient pivotable motion of the cross-piece but without any clearance or play. In the assembly, the clamping sleeves 18, 19 are pushed into the trunion bearings 14 and 15 from the intermediate space between the trunion bearings. The rubber sleeves 8, 9 together with the metal sleeves 10, 11 are pressed into the bearing bushing 5. After aligning the bore through the bushing formed by the metal sleeves 10 and 11 with the flanges 20 of the clamping 18, 19 the threaded bolt 23 with a washer 26 adjacent its head 27 is inserted through a trunion bearing, through the bushing and out from the other trunion bearing. Onto the free thread end of the bolt emerging from the other trunion bearing a second washer or disc 26 is positioned such that its counter beveled surface 25 also extends toward the beveled face 22 of a clamping sleeve. The nut 24 is then tightened upon the threaded portion of the bolt. Prior to tightening, the components will have the spaced relationship as shown in FIG. 2. After tightening, wherein the bolt 24 exerts a force upon the washer 26, the beveled surface 25 will act against beveled surface 22 of clamping sleeve 18 to expand the slotted cylindrical portion 17 of the clamping sleeve outwardly against the walls of the bores of the trunion bearings 14, 15. In a same manner, the same forcing and expanding of the clamping sleeve occurs at the head end of the bolt.

It is therefore apparent that after assembly the clamping sleeves 18, 19 are non-displaceably retained between a rubber sleeve bead and metallic sleeve on one hand and a washer on the other hand. In the event a modification of the mount is used wherein the washer 26 is eliminated and the counter beveled surfaces 25 are formed directly on the bolt head and the nut, then the outer end of one clamping sleeve will be secured against nut 24 and the outer end of the other clamping sleeve will be secured against the head 27. By nondisplaceably securing the clamping sleeves within the trunion bearings possible damage and distortion of the bearing is thus avoided, even though the mount may be subjected to shocks and impacts occuring over a long period of operation of the vehicle involving repeated braking operations.

It will be understood that this invention is susceptible to modification in order to adapt it to different usages and conditions, and accordingly, it is desired to comprehend such modifications within this invention as may fall within the scope of appended claims.

What is claimed is:

1. In a disc brake for a railway vehicle, a resilient pivot mount for a cross member upon the ends of which are pivotally mounted brake levers having brake shoes thereon engageable with a brake disc on one of the wheel or axle of the railway vehicle, comprising a pair of spaced trunion bearings mounted on the frame of the vehicle, a bushing attached to the cross piece, said bushing having a bore therethrough, a pair of compressible rubber sleeves inserted into said bushing from each end thereof, each of said rubber sleeves having a cylindrical bore therethrough and an external annular flange on the outer end thereof, a threaded bolt passing through said trunion bearings and rubber sleeves to support said bushing and cross piece from the frame, a pair of clamping sleeves each having a cylindrical portion in each trunion bearing and a flange at one end of said cylindrical portion engageable with the outer flange end of respective rubber sleeves, said cylindrical portion having an outer end and a plurality of axial slots extending from said outer end substantially the length of said cylindrical portion away from said flange, said outer end having an inwardly beveled surface engageable with correspondingly shaped surfaces on fastener means on said bolt, the tightening of said fastener means on said bolt spreading apart the slotted portions of said cylindrical portion against said trunion bearing.

2. In a disc brake for a railway vehicle as claimed in claim 1 wherein said fastener means comprises a washer having a beveled surface thereon.

3. In a disc brake for a railway vehicle as claimed in claim 1 wherein said threaded bolt has a head and a nut threaded thereon, at least one of said head and nut having a beveled surface engageable with said cylindrical portion beveled surface.

* * * * *